(12) United States Patent
Irisawa

(10) Patent No.: US 8,055,824 B2
(45) Date of Patent: Nov. 8, 2011

(54) INTERFACE UNIT FOR INTERFACING HOST UNIT AND PERIPHERAL UNIT

(75) Inventor: Tatsuya Irisawa, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 165 days.

(21) Appl. No.: 11/344,846

(22) Filed: Jan. 31, 2006

(65) Prior Publication Data

US 2006/0172606 A1    Aug. 3, 2006

(30) Foreign Application Priority Data

Jan. 31, 2005  (JP) ................. 2005-023666

(51) Int. Cl.
G06F 13/12    (2006.01)
G06F 13/00    (2006.01)
(52) U.S. Cl. .......................................... 710/74; 711/100
(58) Field of Classification Search ............. 710/74
See application file for complete search history.

(56) References Cited

U.S. PATENT DOCUMENTS

| 2004/0107327 | A1* | 6/2004 | Takahashi et al. | 711/170 |
| 2004/0202015 | A1* | 10/2004 | Tai et al. | 365/154 |
| 2005/0251593 | A1* | 11/2005 | Lin et al. | 710/62 |
| 2006/0015673 | A1* | 1/2006 | Morrow | 710/315 |

FOREIGN PATENT DOCUMENTS

| JP | 2-219160 | 8/1990 |
| JP | 5-324385 | 12/1993 |
| JP | 8-286925 | 11/1996 |
| JP | 2003-186582 | 7/2003 |
| JP | 2003-281477 | 10/2003 |
| JP | 2004-86505 | 3/2004 |
| JP | 2004-102405 | 4/2004 |
| JP | 2004-102755 | 4/2004 |

OTHER PUBLICATIONS

Hiroto Okada and Tomohiro Yokoyama (Oct. 2001) "Compact and lightweight external storage suitable for built-in instrument", Interface, pp. 156-161 (Japanese reference and English translation).
Norihiko Ochiai and Hiroto Okada (Dec. 2001) "Compact and lightweight external storage suitable for built-in instrument", Interface, pp. 137-147 (Japanese reference-and English translation).
Feb. 1, 2011 Japanese official action in connection with a counterpart Japanese patent application.

* cited by examiner

*Primary Examiner* — Henry Tsai
*Assistant Examiner* — Juanito Borromeo
(74) *Attorney, Agent, or Firm* — Cooper & Dunham LLP

(57) ABSTRACT

An interface unit for interfacing a host unit and first and second peripheral units includes a connector, an identification circuit, and first and second interface circuits. The connector is connected to any one of the first and second peripheral units. The identification circuit determines a type of peripheral unit connected to the connector. The first and second interface circuits interface the host unit with the first and second peripheral units, respectively, based on a result of the determination by the identification circuit. The identification circuit transmits a signal indicating the peripheral unit that is connected to the connector, to the corresponding interface circuit, and the corresponding interface circuit transmits a signal to the host unit, indicating that the corresponding peripheral unit is connected to the connector.

16 Claims, 4 Drawing Sheets

INTERFACE UNIT FOR INTERFACING HOST UNIT AND PERIPHERAL UNIT

TECHNICAL FIELD

The present disclosure generally relates to an interface unit which interfaces a host unit and a peripheral unit (such as a memory card), and a system unit using such an interface unit.

BACKGROUND

In general, a plurality of types of IC (integrated circuit) cards can be connected to a connector of an IC card controller because a plurality of IC cards are interchangeable with each other in terms of their dimensions and shapes. However, a conventional IC card controller may have difficulties of recognizing types of IC cards with an IC card detection signal, which is generated when the IC card is connected to a connector of an IC card controller.

In order to cope with such situation, a conventional art as shown in FIG. 1 includes an IC (integrated circuit) card controller 101 for connecting a host unit 103 and an IC (integrated circuit) card 110.

As shown in FIG. 1, the IC card controller 101 includes a common interface circuit 112 that can be commonly used for a plurality of types of IC cards. As also shown in FIG. 1, the host unit 103 includes a common driver 104 that can be commonly used for plurality of types of IC cards.

The IC card controller 101 includes an IC card slot 111 to which the IC (integrated circuit) card 110 is connected. The IC card controller 101 is connected to the host unit 103 via a bus 102 as shown in FIG. 1.

However, it is not always practicable to install a common driver that can control a plurality of types of IC cards. For example, a personal computer may need unique drivers for a SD™ (secure digital) card and MMC™ (multi media card) card, respectively, to drive the SD card and MMC card although the SD card and MMC card can be interchangeably connected to the personal computer because they have similar dimensions and shapes.

With such background, a conventional IC card controller includes interface circuits and drivers, which are unique to each type of IC cards to identify types of IC cards to be connected to the IC card controller.

Therefore, as for a conventional IC card controller, such unique drivers are used to identify types of IC cards connected to the IC card controller.

FIG. 2 is a block diagram explaining a conventional reader/writer which identifies types of IC cards with drivers unique to each type of IC cards.

As shown in FIG. 2, the reader/writer functions as an interface unit which interfaces a host unit and a memory card, for example.

In FIG. 2, the reader/writer is connected to a host unit such as personal computer via a PCI (peripheral component interconnect) bus, and also connected to a memory card such as SD™ (secure digital) card, SDIO™ (SD input/output) card, and a MMC™ card, for example.

As shown in FIG. 2, a reader/writer 121 is connected to a host unit 123 via a PCI (peripheral components interconnect) bus 122.

The reader/writer 121 includes a memory card slot 131, a MMC interface circuit 132, a SD interface circuit 133, and a PCI interface circuit 134. The host unit 123 includes a MMC driver 124 and a SD driver 125. A memory card 130 (such as SD card, SDIO card, MMC card, etc.) is inserted and connected to the memory card slot 131.

When the memory card 130 is inserted and connected to the memory card slot 131, the MMC interface circuit 132 recognizes that the memory card 130 is connected to the memory card slot 131. At this time, a type of the memory card 130 is not identified yet.

Then, the MMC interface circuit 132 generates and transmits an interrupt signal to the host unit 123 via the PCI interface circuit 134 and PCI bus 122.

The MMC driver 124 in the host unit 123 confirms an interrupt status bit signal transmitted from the MMC interface circuit 132, and recognizes that the memory card 130 is connected to the memory card slot 131.

Then, the MMC driver 124 starts an identification sequence for the memory card 130 connected to the memory card slot 131.

If the memory card 130 connected to the memory card slot 131 is a SD card or SDIO card, the MMC driver 124 writes a SD card insertion bit signal in the MMC interface circuit 132 via the PCI bus 122 and PCI interface circuit 134.

Then, the MMC interface circuit 132 transmits a signal to the SD interface circuit 133 to indicate that the SD card or SDIO card is connected to the memory card slot 131.

Then, the SD interface circuit 133 generates and transmits an interrupt signal to the host unit 123 via the PCI interface circuit 134 and PCI bus 122.

Then, the SD driver 125 in the host unit 123 confirms an interrupt status bit signal transmitted from the SD interface circuit 133, and recognizes that the memory card 130 (for example, SD card or SDIO card) is connected to the memory card slot 131.

Then, the SD driver 125 starts an identification sequence for the memory card 130 (for example, SD card or SDIO card) connected to the memory card slot 131.

After identifying the memory card 130 (for example, SD card or SDIO card), the SD driver 125 conducts an access operation to the memory card 130 (for example, SD card or SDIO card) via the PCI bus 122, PCI interface circuit 134, and SD interface circuit 133, when such access operation is in need.

On one hand, if the memory card 130 connected to the memory card slot 131 is a MMC card, the MMC driver 124 starts an identification sequence for the memory card 130 (i.e., MMC card) connected to the memory card slot 131.

After identifying the memory card 130 (i.e., MMC card), the MMC driver 124 conducts an access operation to the memory card 130 (i.e., MMC card) via the PCI bus 122, is PCI interface circuit 134, and MMC interface circuit 132, when such access operation is in need.

As explained above, the MMC driver 124 conducts a card identification sequence even if a SD card is connected to the memory card slot 131. Therefore, even if only a SD card is connected to the memory card slot 131, both of the MMC driver 124 and SD driver 125 should be installed in the host unit 123 to recognize the SD card.

Furthermore, when the host unit 123 goes into a suspend mode while maintaining a connection of the SD card to the memory card slot 131 and the host unit 123 conducts a resume mode after a suspend mode, the MMC driver 124 and the SD driver 125 in the host unit 123 are returned to an initial status because a power supply to the host unit 123 is disconnected when the host unit 123 goes into a suspend mode.

In such a case, the SD driver 125 judges that the SD card is pulled out from the memory card slot 131 even if the SD card is connected to the memory card slot 131. Therefore, if the host unit 123 goes into a suspend mode when the SD driver 125 is conducting data transfer to the SD card, such data transfer becomes an error when the host unit 123 goes into a resume mode after a suspend mode, thereby the data transfer to the SD card is not automatically restarted in a resume mode.

SUMMARY

The present disclosure relates to interfacing a host unit with a first peripheral unit and a second peripheral unit.

An example of an interface unit for interfacing a host unit with a first peripheral unit and a second peripheral unit includes a connector, an identification circuit, and first and second interface circuits. The connector is connected to any one of the first and second peripheral units. The identification circuit identifies a type of peripheral unit connected to the connector. The first and second interface circuits interface the host unit and the corresponding first and second peripheral units based on an identification result by the identification circuit. The identification circuit transmits a signal indicating the one of the first and second peripheral units that is connected to the connector, to the interface circuit corresponding to the connected peripheral unit, and the same interface circuit in turn transmits a signal to the host unit indicating that the corresponding peripheral unit is connected to the connector. Preferably, the signal indicating the one of the first and second peripheral units that is connected to the connector is transmitted only to the interface circuit corresponding to the connected peripheral unit.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

DETAILED DESCRIPTION

Figure 1:
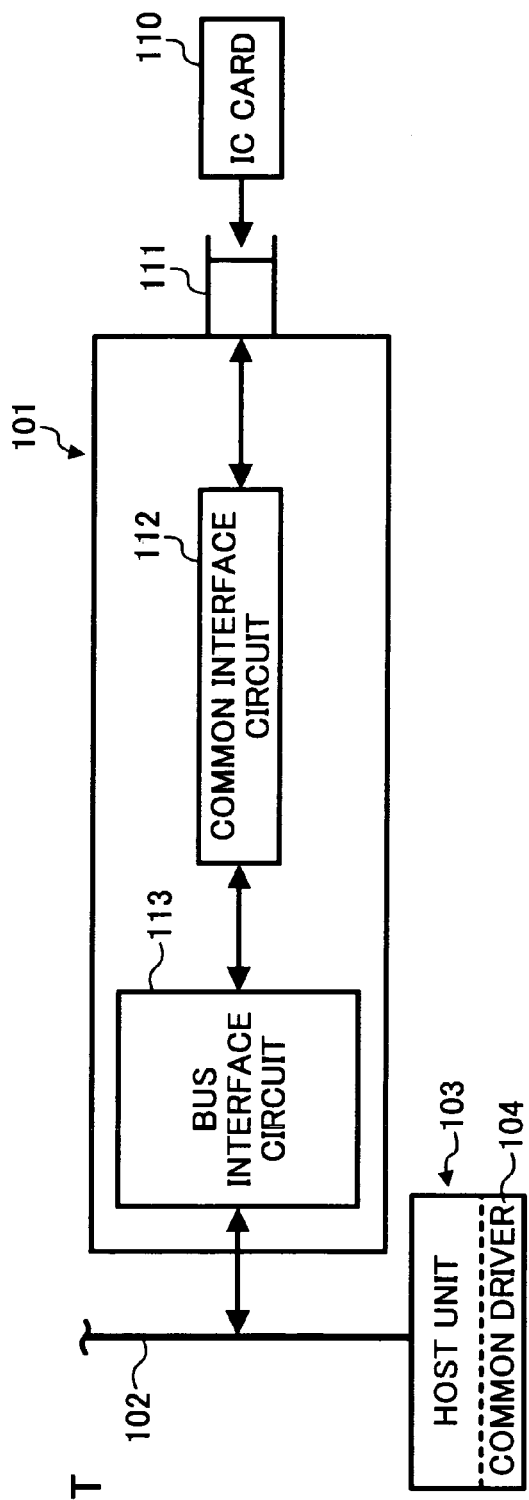
FIG. 1 is a block diagram explaining a conventional interface unit.
Figure 2:
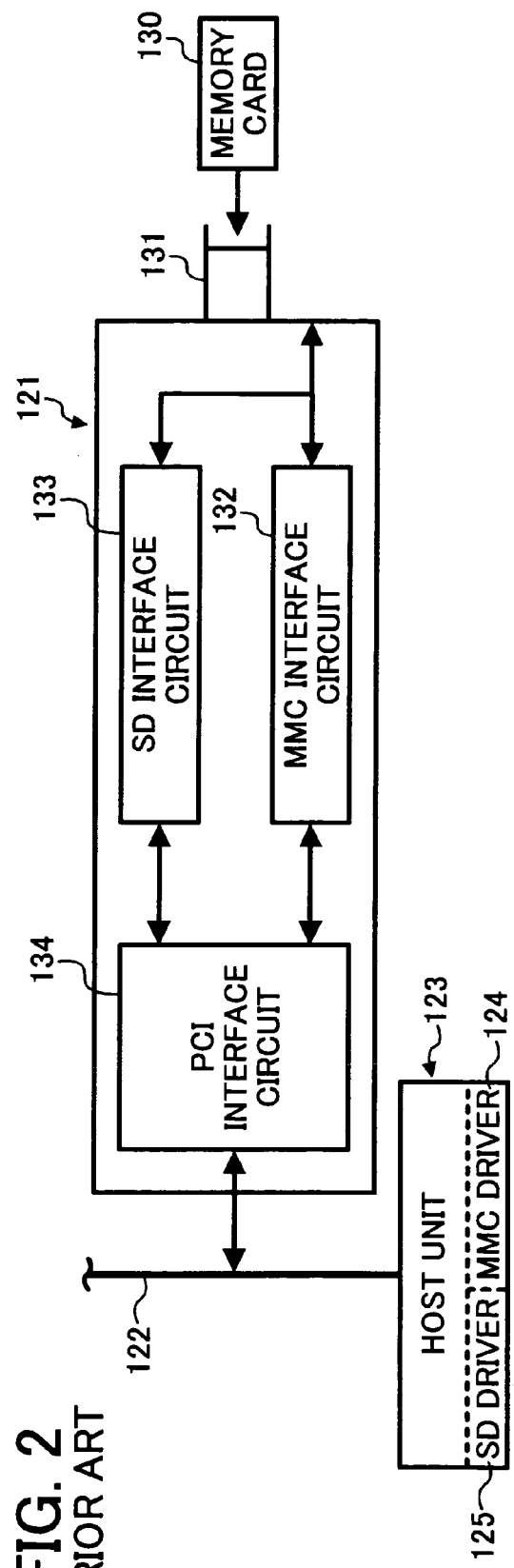
FIG. 2 is a block diagram explaining a conventional reader/writer.

In describing examples and embodiments shown in the drawings, specific terminology is employed for the sake of clarity. However, the disclosure of this present invention is not intended to be limited to the specific terminology so selected and it is to be understood that each specific element includes all technical equivalents that operate in a similar manner.

Referring now to the drawings, wherein like reference numerals designate identical or corresponding parts throughout the several views, an example interface unit is described with reference to FIG. 3.

Figure 3:
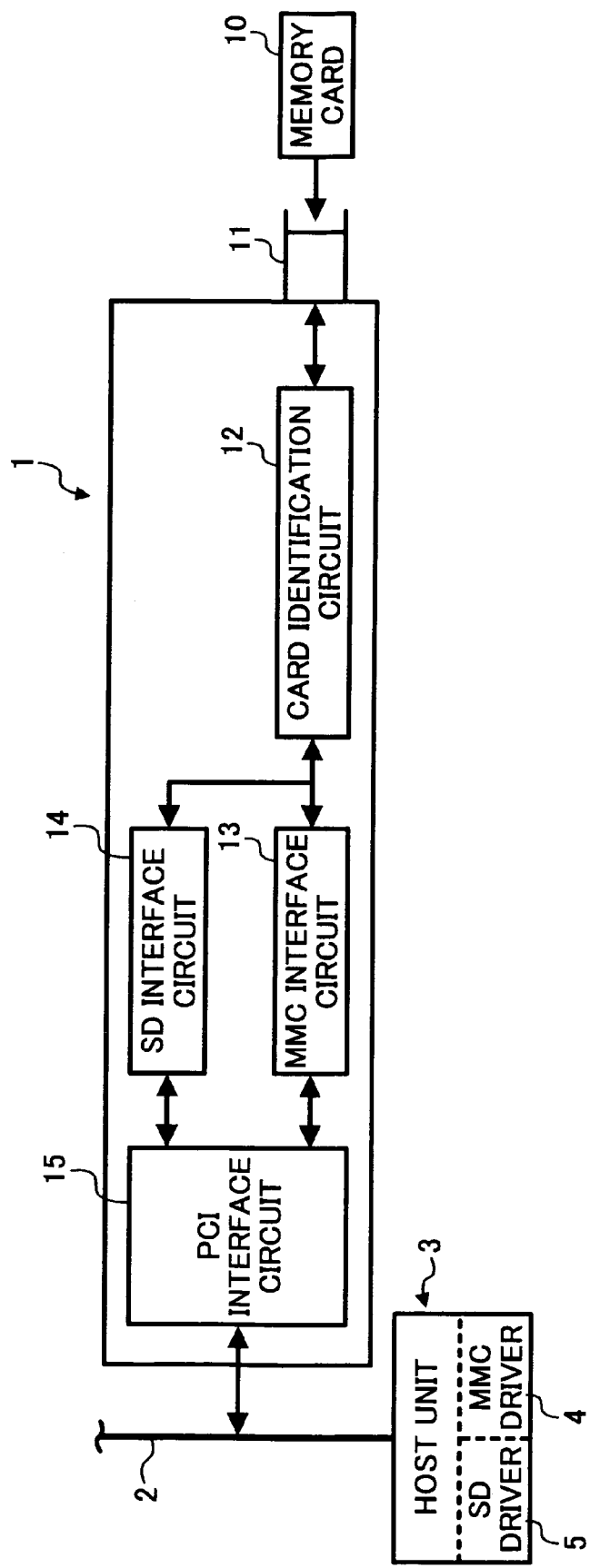
FIG. 3 is a block diagram explaining an interface unit according to an example of this disclosure.

FIG. 3 is a block diagram explaining an interface unit according to an example of this disclosure.

FIG. 3 shows a configuration that an interface unit such as reader/writer is connected to a host unit such as PC (personal computer) via a PCI (peripheral component interconnect) bus, and the interface unit is also connected to a peripheral unit such as memory card.

The memory card can include a SD™ (secure digital) card, SDIO™ (secure digital input/output) card, and MMC™ (multi media card) card, for example.

As shown in FIG. 3, a reader/writer 1 is connected to a host unit 3 such as PC (personal computer) via a PCI (peripheral components interconnect) bus 2. The host unit 3 is installed with a MMC driver 4 and a SD driver 5 to drive the MMC card and the SD card, respectively.

A SD card and a MMC card and interface circuits and drivers corresponding to the SD card and MMC card are referenced in the following description and drawings for the purpose of explanation. However, an interface unit and a system unit according to the present disclosure can employ any of various types of cards and corresponding interface circuits and drivers.

As shown in FIG. 3, the reader/writer 1 includes a memory card slot 11, a card identification circuit 12, a MMC interface circuit 13, a SD interface circuit 14, and a PCI interface circuit 15, wherein the PCI interface circuit 15 is connected to the PCI bus 2.

In the reader/writer 1, a memory card 10 such as SD card and MMC card is inserted and connected in the memory card slot 11.

The card identification circuit 12 identifies types of the memory card 10 which is inserted and connected to the memory card slot 11.

The MMC interface circuit 13 is used for interfacing a MMC card when the MMC card is connected to the memory card slot 11. The SD interface circuit 14 is used for interfacing a SD card when the SD card is connected to the memory card slot 11.

The memory card slot 11 is connected to the card identification circuit 12. Each of the MMC interface circuit 13 and the SD interface circuit 14 is also connected to the card identification circuit 12.

Each of the MMC interface circuit 13 and the SD interface circuit 14 is connected to the PCI interface circuit 15, and the PCI interface circuit 15 is connected to the host unit 3 via the PCI bus 2.

The memory card 10 functions as a peripheral unit. The memory card slot 11 functions as a connection unit. The card identification circuit 12 functions as an identification circuit. The MMC interface circuit 13, SD interface circuit 14, and PCI interface circuit 15 function as interface circuits.

With the above-mentioned configuration, the memory card 10 such as SD card and MMC card is inserted and connected to the memory card slot 11.

When the memory card 10 is inserted and connected to the memory card slot 11, the card identification circuit 12 recognizes that the memory card 10 is connected to the memory card slot 11, and starts an identification sequence for the connected memory card 10.

If the memory card 10 connected to the memory card slot 11 is a MMC card, the card identification circuit 12 transmits a signal to the MMC interface circuit 13 that the MMC card is connected to the memory card slot 11.

Then, the MMC interface circuit 13 generates and transmits an interrupt signal to the host unit 3 via the PCI interface circuit 15 and PCI bus 2.

The MMC driver 4 in the host unit 3 confirms an interrupt status bit signal transmitted from the MMC interface circuit 13, and recognizes that the memory card 10 connected to the memory card slot 11 is a MMC card.

Then, the MMC driver 4 starts an identification sequence for the memory card 10 (i.e., MMC card) connected to the memory card slot 11.

After identifying the memory card 10 (i.e., MMC card), the MMC driver 4 conducts an access operation to the memory card 10 (i.e., MMC card) via the PCI bus 2, PCI interface circuit 15, MMC interface circuit 13, and card identification circuit 12, when such access operation is in need.

On one hand, if the memory card 10 connected to the memory card slot 11 is a SD card, the card identification circuit 12 transmits a signal to the SD interface circuit 14 indicating that the SD card is connected to the memory card slot 11.

The SD interface circuit 14 generates and transmits an interrupt signal to the host unit 3 via the PCI interface circuit 15 and PCI bus 2.

The SD driver 5 in the host unit 3 confirms an interrupt status bit signal transmitted from the SD interface circuit 14, and recognizes that the memory card 10 connected to the memory card slot 11 is an SD card.

Then, the SD driver 5 starts an identification sequence for the memory card 10 (i.e., SD card) connected to the memory card slot 11.

After identifying the memory card 10 (i.e., SD card), the SD driver 5 conducts an access operation to the memory card 10 (i.e., SD card) via the PCI bus 2, PCI interface circuit 15, SD interface circuit 14, and card identification circuit 12, when such access operation is in need.

Figure 4:
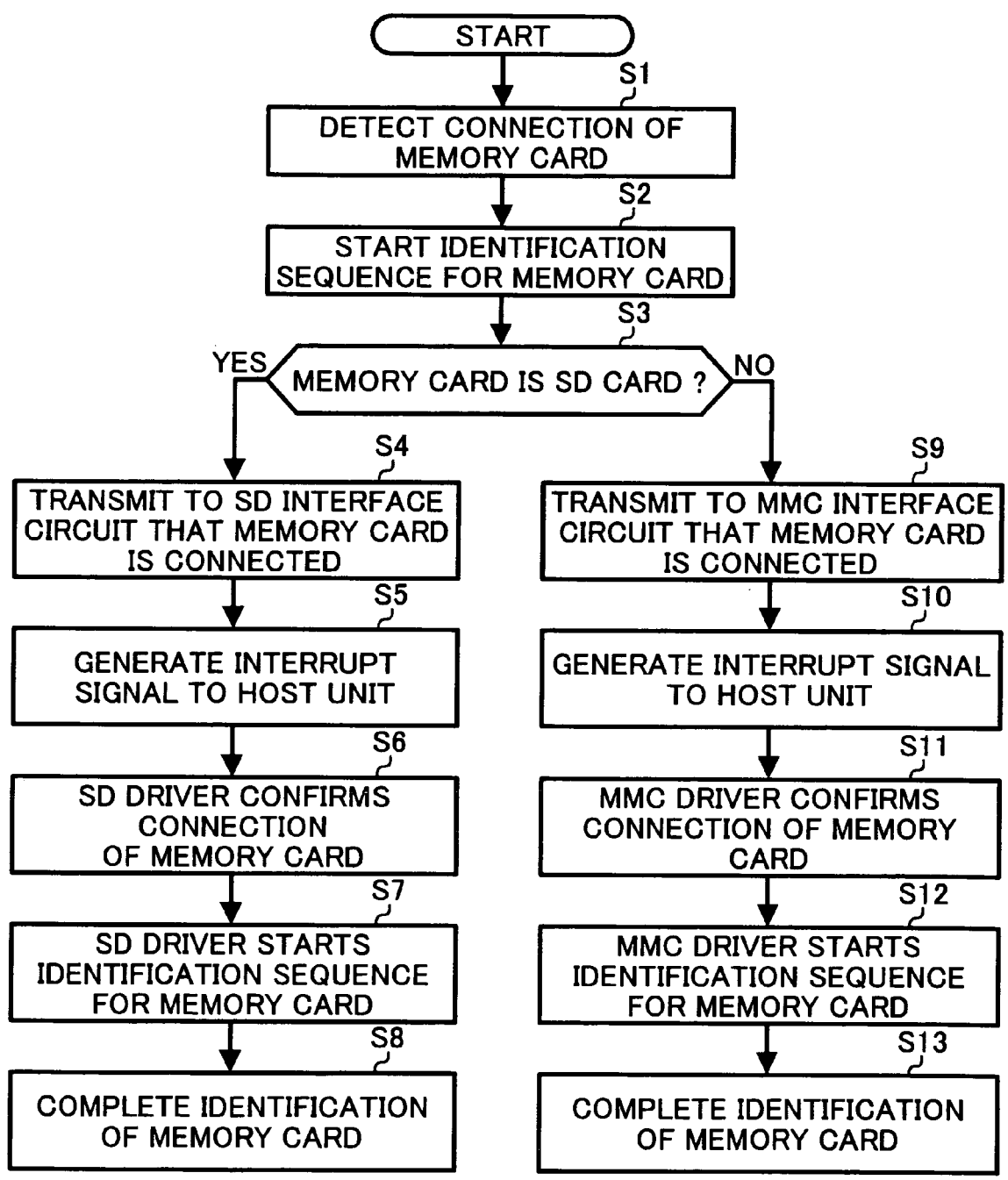
FIG. 4 is a flow chart illustrating a process when a memory card is connected to a memory card slot of the interface unit in FIG. 3.

FIG. 4 is a flow chart explaining a process when the memory card 10 is connected to the memory card slot 11 of the reader/writer 1 in FIG. 3.

As shown in FIG. 4, in step S1, when the memory card 10 is connected to the memory card slot 11, a signal indicating a connection of the memory card 10 is transmitted from the memory card slot 11 to the card identification circuit 12.

In step S2, the card identification circuit 12 starts an identification sequence for the connected memory card 10.

In step S3, the card identification circuit 12 recognizes types of the connected memory card 10, and checks whether the connected memory card 10 is a SD card. If the card identification circuit 12 identifies the connected memory card 10 as an SD card, the process goes to step S4.

In step S4, the card identification circuit 12 transmits a signal only to the SD interface circuit 14 indicating that the memory card 10 connected to the memory card slot 11 is an SD card.

In step S5, the SD interface circuit 14 generates and transmits an interrupt signal to the host unit 3 via the PCI interface circuit 15 and PCI bus 2 indicating that the memory card 10 connected to the memory card slot 11 is an SD card.

In step S6, the SD driver 5 in the host unit 3 confirms an interrupt status bit signal transmitted from the SD interface circuit 14, and recognizes that the memory card 10 (i.e., SD card) is connected to the memory card slot 11.

In step S7, the SD driver 5 starts an identification sequence for the memory card 10 (i.e., SD card) connected to the memory card slot 11.

After identifying the memory card 10 (i.e., SD card), in step S8, the SD driver 5 conducts an access operation to the memory card 10 (i.e., SD card) via the PCI bus 2, PCI interface circuit 15, SD interface circuit 14, and card identification circuit 12, when such access operation is in need.

On one hand, if the card identification circuit 12 identifies the connected memory card 10 as a MMC card in step S3, the process goes to step S9.

In step S9, the card identification circuit 12 transmits a signal only to the MMC interface circuit 13 that the memory card 10 connected to the memory card slot 11 is an MMC card.

In step S10, the MMC interface circuit 13 generates and transmits an interrupt signal to the host unit 3 via the PCI interface circuit 15 and PCI bus 2 indicating that the memory card 10 connected to the memory card slot 11 is an MMC card.

In step S11, the MMC driver 4 in the host unit 3 confirms an interrupt status bit signal transmitted from the MMC interface circuit 13, and recognizes that the memory card 10 connected to the memory card slot 11 is an MMC card.

In step S12, the MMC driver 4 starts an identification sequence for the memory card 10 (i.e., MMC card) connected to the memory card slot 11.

After identifying the memory card 10 (i.e., MMC card) in step S13, the MMC driver 4 conducts an access operation to the memory card 10 (i.e., MMC card) via the PCI bus 2, PCI interface circuit 15, MMC interface circuit 13, and card identification circuit 12, when such access operation is in need.

Figure 5:
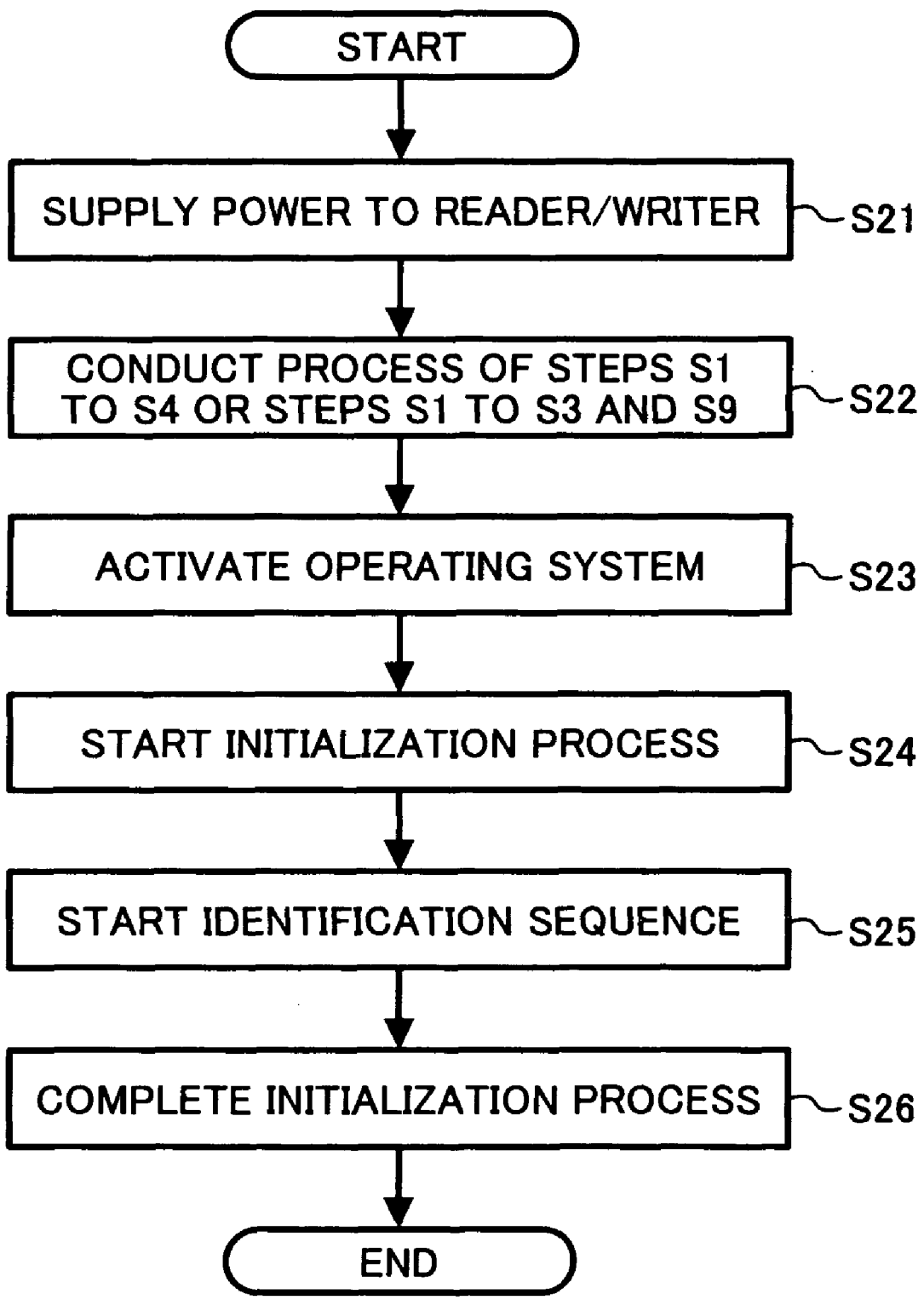
FIG. 5 is a flow chart illustrating a process to be conducted by a host unit to a memory card connected to a memory card slot when a host unit is activated by a resume mode after a suspend mode.

FIG. 5 is a flow chart explaining a process to be conducted by the host unit 3 to the memory card 10 connected to the memory card slot 11 when the host unit 3 is activated by a resume mode after a suspend mode.

As shown in FIG. 5, in step S21, the host unit 3 supplies power to the reader/writer 1 when the host unit 3 is activated by a resume mode after a suspend mode.

In step S22, steps S1 to S4 in FIG. 4 are conducted in a case that the connected memory card 10 is a SD card, or steps S1 to S3 and S9 in FIG. 4 are conducted in a case that the connected memory card 10 is a MMC card.

Then, in step S23, the host unit 3 activates an operating system.

In step S24, the MMC driver 4 or the SD driver 5 conducts a predetermined initialization process.

In step S25, a driver (for example, MMC driver 4 or SD driver 5) which corresponds to a type of the memory card 10 identified by the card identification circuit 12, before entering a suspend mode, starts an identification sequence for the memory card 10 connected to the memory card slot 11. For example, if the identified memory card 10 is a SD card, the SD driver 5 conducts an identification sequence of the memory card 10 (i.e., SD card), and if the identified memory card 10 is a MMC card, the MMC driver 4 conducts an identification sequence of the memory card 10 (i.e., MMC card).

In step S26, the MMC driver 4 or the SD driver 5 completes the initialization process.

As such, when a host unit is activated by a resume mode after a suspend mode, an interface circuit and a system unit according to an exemplary embodiment can conduct an identification of the connected peripheral unit (for example, memory card) before activating an operating system of the host unit.

Under such configuration, when a resume mode is conducted after a suspend mode, the host unit may not misinterpret that the peripheral unit (for example, memory card) is pulled out from the connector, thereby the host unit can restart data transfer with the peripheral unit (for example, memory card) automatically after a resume mode.

As discussed above, the reader/writer 1, which functions as an interface unit, includes the card identification circuit 12 which identifies types of the memory card 10 when the memory card 10 is inserted and connected to the memory card slot 11.

With an employment of the card identification circuit 12 in the reader/writer 1, the driver in the host unit 3 may not misinterpret that a connection between the driver and the memory card 10 is disengaged when a resume mode is activated after a suspend mode.

Furthermore, an access operation between the driver and the memory card 10 connected to the memory card slot 11 which is interrupted by a suspend mode can be automatically restarted when a resume mode is activated after a suspend mode.

Furthermore, by conducting an identification of the memory card 10 with hardware (i.e., the card identification circuit 12) when the memory card 10 is connected to the memory card slot 11, a development of a new driver (i.e., software) may not be required for recognizing a card to be connected to the memory card slot 11.

The specific examples and embodiments discussed herein are illustrative, and many variations can be introduced on these examples and embodiments without departing from the spirit of the disclosure or from the scope of the appended claims. For example, elements and/or features of different illustrative embodiments and examples may be combined with each other and/or substituted for each other within the scope of this disclosure and appended claims.

In addition, in the above-described embodiments, the memory card 10 includes a SD card and MMC card. However, the memory card 10 is not limited to the SD card and MMC card, but can include other types of peripheral units, such as Memory Stick™, Smart Media™, xD Picture card™, Smart card, Compact Flash™, 32-bit PC card™, and 16-bit PC card Express card™, for example, or another peripheral unit.

In the above-described embodiment, the reader/writer 1 functions as an interface unit between the memory card 10 and the host unit 3. However, the reader/writer 1 is not limited as an interface unit for the memory card 10. The reader/writer 1 can also function as an interface unit between a peripheral unit such as IC card (for example, communication card and LAN card) and the host unit 3.

In the above-described embodiment, the reader/writer 1 includes two interface circuits (i.e., MMC interface circuit and SD interface circuit) for respective types of cards (i.e., MMC card and SD card). However, the reader/writer 1 can include more than two interface circuits for corresponding types of cards, as required. Similarly, although the host unit 3 in the above-described embodiment includes two drivers (i.e., MMC driver and SD driver) for respective types of cards (i.e., MMC card and SD card), the host unit 3 can include more than two drivers for corresponding types of cards, as required.

In the above-described embodiment, the PCI bus is used as a bus. However, the bus is not limited to the PCI bus, but also includes other types such as USB (universal serial bus), for example.

The above-described interface unit can be used with a variety of host units such as personal computer, digital camera, printer, and copier, for example. Therefore, the above-described interface unit and the above-mentioned host unit can be combined and used as a system unit as a whole.

Numerous additional modifications and variations are possible in light of the above teachings. It is therefore to be understood that within the scope of the appended claims, the disclosure of the present invention may be practiced otherwise than as specifically described herein.

This application claims priority from Japanese patent application No. 2005-023666 filed on Jan. 31, 2005 in the Japan Patent Office, the entire contents of which are hereby incorporated by reference herein.

What is claimed is:

1. An interface unit configured to interface a host unit with first and second peripheral units controlled by the host unit, the host unit including a first driver for driving the first peripheral unit and a second driver for driving the second peripheral unit, the interface unit comprising:
a connector configured to be connected to any one of the first and second peripheral units;
a first interface circuit configured to interface the host unit and the first peripheral unit;
a second interface circuit configured to interface the host unit and the second peripheral unit;
an identification circuit connected to the connector and configured to
(a) determine a type of peripheral unit connected to the connector and
(b) generate a first identification sequence instruction for the first peripheral unit and selectively transmit the first identification sequence instruction directly to the first interface circuit for interface to the first peripheral unit, when the first peripheral unit is connected to the connector, and generate a second identification sequence instruction for the second peripheral unit and selectively transmit the second identification sequence instruction directly to the second interface circuit for interface to the second peripheral unit, when the second peripheral unit is connected to the connector; and
a host interface circuit configured to be connected to the host unit,
wherein the first interface circuit is configured to interface the host unit and the first peripheral unit via the host interface circuit, when the first peripheral unit is connected to the connector and the host unit is connected to the host interface circuit, based on the first identification sequence instruction output by the identification circuit; and
wherein the second interface circuit is configured to interface the host unit and the second peripheral unit via the host interface circuit, when the second peripheral unit is connected to the connector and the host unit is connected to the host interface circuit, based on the second identification sequence instruction output by the identification circuit;
wherein when the first peripheral unit is connected to the connector,
(i) the identification circuit transmits the first identification sequence instruction to the first interface circuit, indicating that the first peripheral unit is connected to the connector,
(ii) the first interface circuit transmits a signal to the host unit via the host interface circuit, indicating that the first peripheral unit is connected to the connector, and
(iii) the first driver of the host unit confirms the signal transmitted by the first interface circuit and starts an identification sequence for the first peripheral unit,
wherein when the second peripheral unit is connected to the connector,
(1) the identification circuit transmits the second identification sequence instruction to the second interface circuit, indicating that the second peripheral unit is connected to the connector,
(2) the second interface circuit transmits a signal to the host unit, indicating that the second peripheral unit is connected to the connector via the host interface circuit, and
(3) the second driver of the host unit confirms the signal transmitted by the second interface circuit and starts an identification sequence for the second peripheral unit, and wherein said interface unit is external to each of the first peripheral unit and second peripheral unit.

2. The interface unit according to claim 1, wherein when the first peripheral unit is connected to the connector, the identification circuit transmits a signal to the first interface circuit, but not to the second interface circuit, indicating that the first peripheral unit is connected to the connector, and the first interface circuit transmits a signal to the host unit via the host interface circuit, indicating that the first peripheral unit is connected to the connector.

3. The interface unit according to claim 1, wherein when the second peripheral unit is connected to the connector, the identification circuit transmits a signal to the second interface circuit, but not to the first interface circuit, indicating that the second peripheral unit is connected to the connector, and the second interface circuit transmits a signal to the host unit via the host interface circuit, indicating that the second peripheral unit is connected to the connector.

4. The interface unit according to claim 1, wherein the host unit includes a first driver configured to conduct an operation control of the first peripheral unit, and a second driver configured to conduct an operation control of the second peripheral unit.

5. The interface unit according to claim 1, wherein the peripheral unit connected to the connector includes a memory card.

6. The interface unit according to claim 5, wherein the memory card includes any one of a SD (secure digital) card, a SDIO (secure digital input/output) card, and a MMC (multi media card) card.

7. The interface unit of claim 1, wherein the interface unit is configured to be simultaneously connected to the host unit via said host interface circuit, and any one of the first and second peripheral units via said connector.

8. The interface unit of claim 1, wherein the interface unit is configured to access information stored on the peripheral unit connected to the connector, in response to an access operation instruction from the host unit.

9. The interface unit of claim 1, wherein the host unit is external to the first and second peripheral units, and the interface unit is external to the host unit.

10. A system unit, comprising:
a host unit including a first driver and a second driver;
a first peripheral unit and a second peripheral unit configured to be controlled by the host unit; and
an interface circuit configured to interface the host unit with the first and second peripheral units, the interface circuit comprising:
  a connector configured to be connected to any one of the first and second peripheral units;
  a first interface circuit configured to interface the host unit and the first peripheral unit;
  a second interface circuit configured to interface the host unit and the second peripheral unit;
  an identification circuit connected to the connector with one signal line and configured to
    (a) determine a type of peripheral unit connected to the connector upon resumption of the host unit from a low power mode and
    (b) generate a first identification sequence instruction for the first peripheral unit and selectively transmit the first identification sequence instruction directly to the first interface circuit for interface to the first peripheral unit, when the first peripheral unit is connected to the connector, and generate a second identification sequence instruction for the second peripheral unit and selectively transmit the second identification sequence instruction directly to the second interface circuit for interface to the second peripheral unit, when the second peripheral unit is connected to the connector; and
  a host interface circuit configured to be connected to the host unit,
wherein the first interface circuit is configured to interface the host unit and the first peripheral unit via the host interface circuit, when the first peripheral unit is connected to the connector and the host unit is connected to the host interface circuit, based on the first identification sequence instruction output by the identification circuit; and
wherein the second interface circuit is configured to interface the host unit and the second peripheral unit via the host interface circuit, when the second peripheral unit is connected to the connector and the host unit is connected to the host interface circuit, based on the second identification sequence instruction output by the identification circuit;
wherein when the first peripheral unit is connected to the connector,
  (A) the identification circuit transmits the first identification sequence instruction to the first interface circuit, indicating that the first peripheral unit is connected to the connector,
  (B) the host unit activates an operating system after the transmission of the first identification sequence instruction,
  (C) the first driver of the host unit conducts a predetermined initialization process,
  (D) the first driver starts an identification sequence for the first peripheral unit, and
  (E) the first driver completes the initialization process,
wherein when the second peripheral unit is connected to the connector,
  (I) the identification circuit transmits the second identification sequence instruction to the second interface circuit, indicating that the second peripheral unit is connected to the connector,
  (II) the host unit activates an operating system after the transmission of the second identification sequence instruction,
  (III) the second driver of the host unit conducts a predetermined initialization process,
  (IV) the second driver starts an identification sequence for the first peripheral unit, and
  (V) the second driver completes the initialization process, and
wherein said interface circuit is external to each of the first peripheral unit and second peripheral unit.

11. The system unit according to claim 10, wherein the host unit includes a first driver configured to conduct an operation control of the first peripheral unit, and a second driver configured to conduct an operation control of the second peripheral unit.

12. The system unit according to claim 10, wherein the peripheral unit connected to the connector includes a memory card.

13. The system unit according to claim 12, wherein the memory card includes a SD (secure digital) card, a SDIO (secure digital input/output) card, and a MMC (multi media card) card.

14. A method for interfacing a first peripheral unit and a second peripheral unit to a host unit via an interface unit after the host unit was in a low power mode, the first peripheral unit and the second peripheral unit being controlled by the host unit, the host unit including a first driver for driving the first peripheral unit and a second driver for driving the second peripheral unit, said method comprising:

(a) detecting, by an identification circuit of the interface unit, the first peripheral unit being connected to a connector of the interface unit;

(b) identifying, by the identification circuit and based on a detection result of (a), a type of the peripheral unit connected via the first interface unit to the host unit and generating a first identification sequence instruction for a first peripheral unit and selectively transmitting the first identification sequence instruction directly to a first interface circuit for interface to the first peripheral unit, when the first peripheral unit is connected to the connector, and generating a second identification sequence instruction for a second peripheral unit and selectively transmitting the second identification sequence instruction directly to a second interface circuit for interface to the second peripheral unit, when the second peripheral unit is connected to the connector;

(c) activating an operating system of the host unit; and (d) transmitting a signal from the interface unit to the second driver of the host unit, wherein the second interface circuit is configured to interface the host unit and the second peripheral unit via the host interface circuit, when the second peripheral unit is connected to the connector and the host unit is connected to the host interface circuit, based on the second identification sequence instruction output by the identification circuit;

wherein when the first peripheral unit is connected to the connector, (i) the identification circuit transmits the first identification sequence instruction to the first interface circuit, indicating that the first peripheral unit is connected to the connector, (ii) the first interface circuit transmits a signal to the host unit via the host interface circuit, indicating that the first peripheral unit is connected to the connector, and (iii) the first driver of the host unit confirms the signal transmitted by the first interface circuit and starts an identification sequence for the first peripheral unit, wherein when the second peripheral unit is connected to the connector, (1) the identification circuit transmits the second identification sequence instruction to the second interface circuit, indicating that the second peripheral unit is connected to the connector, (2) the second interface circuit transmits a signal to the host unit, indicating that the second peripheral unit is connected to the connector via the host interface circuit, and (3) the second driver of the host unit confirms the signal transmitted by the second interface circuit and starts an identification sequence for the second peripheral unit, and wherein said interface unit is external to each of the first peripheral unit and second peripheral unit.

15. The method of claim 14, wherein the signal transmitted from the interface unit to the driver of the host unit indicates the type of the peripheral unit connected via the interface unit to the host unit.

16. The method of claim 14, further comprising allowing the driver to conduct operation control of the peripheral unit.

* * * * *